Patented Sept. 4, 1951

2,566,363

UNITED STATES PATENT OFFICE 2,566,363

TERTIARY ALKOXY AMINO SILANES

George Wesley Pedlow, Jr., Easton, Pa., and Carl Shelley Miner, Jr., Evanston, Ill., assignors to Minnesota Mining & Manufacturing Company, St. Paul, Minn., a corporation of Delaware No Drawing. Application April 22, 1946, Serial No. 663,946

15 Claims. (Cl. 260—448.8)

This application is a continuation-in-part of our copending application Serial No. 470,904, filed December 31, 1942.

The present invention relates to novel organic compounds of silicon. More particularly it concerns organic compounds of silicon containing a hydrolyzable group, especially such as an amino or nitrogen group, and having one or more other groups which are resistant to hydrolysis, especially a tertiary-alkoxy group or other analogous tertiary carbinoxy group; also hydrolyzation products and other derivatives of the foregoing have been invented by us. Di-tertiary-butoxydiaminosilane,

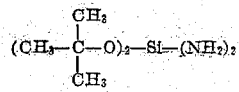

is an example of the novel compounds and products of our invention, though we have produced, and here contemplate, a number of other compounds or products having many of the same novel attributes and properties, as will be discussed more fully hereinafter. Various unique uses of these novel products will also be mentioned later herein.

Silicon tetrachloride $SiCl_4$, is a material which has been known for many, many years. It can be produced relatively cheaply in different ways, as for example, by blowing chlorine through a tower packed with sand and coke, maintained under controlled temperature and other conditions. Thus it will be seen that silicon tetrachloride can be made from relatively cheap raw materials. Heretofore others have produced certain organic silicon compounds employing silicon tetrachloride as a reactant. One of the best known of these is ethyl orthosilicate, i. e. $(C_2H_5O)_4Si$, which may also be referred to as tetraethoxysilane. (Heretofore the term "silicane" has frequently been used in connection with this class of compounds, but "silane" is preferred in the more modern nomenclature). It will be noted that ethyl orthosilicate, i. e. tetra-ethoxysilane (known as early as the year 1846), is made up of primary alkoxy groups joined to the silicon atom. This product can be produced by the reaction of silicon tetrachloride with ethyl alcohol under certain conditions. Ethyl alcohol is of course a primary alcohol, and the ethoxy radical of that alcohol will replace the chlorine of silicon tetrachloride, thus giving a tetraethoxysilane, which is more commonly known as ethyl orthosilicate. HCl is evolved in such reaction. The ethyl orthosilicate, however, if exposed to moist atmosphere hydrolyzes in a short time, apparently reproducing the ethyl alcohol, which volatilizes, leaving a residue of silica.

Also, heretofore other alkoxy silanes of primary alcohols, and, to a lesser extent, of secondary alcohols, have been produced. In connection with the difficulties encountered in the production of alkoxy silanes of secondary alcohols, see "Alkyl Orthosilicates" by A. W. Dearing and E. Emmet Reid, Journal American Chemical Society, vol. 50, (1928), page 3058. None of such prior art alkoxy silanes, however, have had the properties or characteristics of the products of our invention, herein described and claimed, and none of the products of our invention hereinafter described and illustrated have previously been known.

The subject matter herein described and claimed is in the nature of an amplification of subject matter taken directly from our prior application Serial No. 470,904, filed December 31, 1942, and is most particularly concerned with compounds which are silicon derivatives of tertiary alcohols and which also contain reactive or readily hydrolyzable radicals; and this application is especially concerned with products of that type which, following hydrolysis, yield a non-acidic reaction product.

The tertiary alcohols may contain such groups as alkyl, chloroalkyl, aryl, aralkyl, or alicyclic groups attached to the carbinol carbon, and the term "tertiary-carbinoxy" as herein used is intended to cover the radical derived from any tertiary alcohol by removal of the hydrogen atom from the hydroxyl group attached to the tertiary carbon atom. Analogously, the term "carbinoxy" covers the radical derived from any alcohol by removal of the hydrogen atom from the hydroxyl (alcohol) group.

Tertiary-carbinoxy aminosilanes, of which a number of examples are given hereinafter, are products of the type above identified and are unique and different, to the best of our knowledge, from any products known prior to our invention. These products are widely different in stability and other properties from the prior art alkoxy silanes above mentioned, e. g. ethyl orthosilicate, and they have some very important differences even from certain other tertiary-carbinoxy silanes, e. g. tertiary-alkoxy chlorosilanes or other tertiary-carbinoxy chlorosilanes, disclosed for the first time, insofar as we are aware, in our aforesaid parent application Ser. No. 470,904.

The tertiary-carbinoxy chlorosilanes, upon coming in contact with, for example, cloth or paper, will react with the adsorbed moisture in the material and perhaps also with the hydroxyl groups of the cellulose to eliminate chlorine from the molecule in the form of hydrogen chloride. This strongly acid reaction product will cause serious degradation of the cloth or paper under ordinary conditions. However, the tertiary-alkoxy aminosilanes, particularly comprehended herein, when similarly coated on cloth and exposed to similar conditions, will produce ammonia or other nitrogen-containing compound (which is not harmful to cloth or the like) and leave a treatment on the fabric which is highly resistant to further hydrolysis or reaction under ordinary conditions. Such a treatment serves to produce a new type of fabric (further described and claimed in the copending application of Carl Shelley Miner, Jr., Ser. No. 663,947, filed concurrently herewith) which is repellent to water and will withstand washing in water or dry-cleaning solvents, such as ordinary cleaning naphtha.

The salient chemical compounds illustrative of our invention herein described and claimed have, or approximate, the molecular formula $(RO)_xSiX_{4-x}$, where RO represents an alkoxy or other carbinoxy group and at least one RO represents a monovalent tertiary-carbinoxy radical, X represents a monovalent amino or nitrogen group and $x$ is an integer from 2 to 3. Certain outstanding compounds of our invention, coming within the aforesaid classification, of which di-tertiary-butoxydiaminosilane and di-tertiary-amoxydiaminosilane are examples, are liquid products under ordinary conditions, viz. ordinary room temperatures and pressures. Other products of our invention, of the type indicated, may have appreciably higher or lower melting and/or boiling points depending upon the particular substituent groups employed.

Further details in respect to various of the compounds of our invention will appear in connection with the description of illustrative methods for preparing the same.

Further, our invention comprehends chemical compounds having the formula

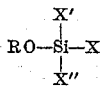

where RO is a tertiary-carbinoxy group, X is a monovalent hydrolyzable nitrogen group, and X' and X'' are monovalent groups, e. g. organic groups or hydrolyzable nitrogen groups, and may be the same or different. Other variations are discussed and illustrated hereinafter.

Organic silicon compounds of this invention which contain hydrolyzable nitrogen attached to silicon may preferably be prepared by amination or ammonolysis, e. g. with anhydrous ammonia, of tertiary-carbinoxy chlorosilanes. The chlorosilanes may in turn be prepared by reaction of tertiary alcohols with silicon tetrachloride in the presence of an acid acceptor, as described and claimed in our said copending application Ser. No. 470,904. While organic chlorine-silicon compounds are particularly illustrated herein as the intermediate compounds, compounds containing a halogen other than chlorine, for example, bromine, are also contemplated.

Ammonia may be reacted with the various tertiary-corbinoxy chlorosilanes with complete elimination of the chlorine atoms attached to silicon. While this ammonolysis reaction presumably initially results in a simple replacement of chlorine by amino groups, and while the resulting organic silicon products do contain hydrolyzable nitrogen, the proportion of such nitrogen as determined by analysis may be somewhat less than the theoretical amount based on the substitution of —NH₂ for —Cl in the original tertiary-carbinoxy chlorosilane. In many cases, however, the percentage of hydrolyzable nitrogen closely coincides with the theoretical amount, justifying the naming of these two compounds as tertiary-carbinoxy aminosilanes.

Thus, compounds have been isolated which on analysis have been found to agree closely with the formula

above discussed, where $x$ is 2 or 3. Also and in other words, compounds have been isolated which on analysis have been found to agree closely with the above-mentioned formula

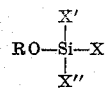

but in which X' represents a tertiary-carbinoxy group, X'' represents a tertiary-carbinoxy or an amino group, X is specifically an amino group, and RO is specifically a tertiary-alkoxy group. Of these, the preferred compounds for certain present uses are di-tertiary-carbinoxy diaminosilanes, e. g. the di-t-alkoxy diaminosilanes,

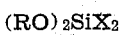

in which the two monovalent tertiary-alkoxy radicals may be the same or different, and likewise the amino (or nitrogen) groups may be the same or different; and, as the term amino group is used herein, it may refer to a group derived from ammonia, from an amine or from an equivalent amino compound.

In all cases investigated, even including resinous and apparently partially condensed products, e. g. products obtained from the ammonolysis of the t-alkoxy trichlorosilanes, the compounds prepared by ammonolysis as above indicated contain hydrolyzable nitrogen and are capable of rendering acid-sensitive hydrophilic materials (e. g. cellulose) water-repellent without degradation of the substance; and the water-repellency of cloth or the like, thus treated, effectively withstands the washing thereof in water or hydrocarbon solvents.

The term "hydrolyzable nitrogen" as here used refers to nitrogen which is liberated either in the form of ammonia, an amine or an equivalent amino compound or salt on hydrolysis. Thus, the nitrogen may be present in the organic silicon material in such groupings as

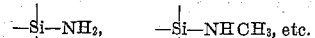

Illustrative and advantageous procedures for preparing the new class of compounds of this invention will now be given. However, it will be understood that the novel products are contemplated irrespective of the particular method of production described.

In the following examples, all parts are by weight (unless the contrary is stated).

EXAMPLE I

*Preparation of di-t-butoxydiaminosilane*

One thousand and fifty (1050) parts of benzene and 510 parts of silicon tetrachloride are placed in a reaction vessel, preferably glass lined, and cooled to about 10° C. by means of brine or other heat exchange medium. While stirring the solution, 498 parts of pyridine is slowly added, the temperature being kept below 20° C. during the addition. The addition of the pyridine requires a substantial period of time, e. g. from 1 to 2 hours, more or less, depending on the efficiency of the cooling system. Throughout the entire addition the pyridine and silicon tetrachloride react to form a white precipitate which toward the end forms a fairly thick paste with the benzene. The formation of a similar white precipitate on the walls of the reaction vessel as a result of the inter-reaction of the vapors of the reactants can be reduced to a minimum by having the pyridine inlet extend to within a few inches of the surface of the benzene. After addition of the pyridine is complete the mixture is stirred, e. g. an additional 15 minutes, more or less.

Four hundred and forty-four (444) parts of tertiary butyl alcohol is then added, all at once. The temperature rises slowly at first, but once above about 30° C. it rises rather quickly. Unless the dimensions of the reaction vessel are sufficiently restricted, it is desirable to employ internal cooling coils or elements, so that loss of material due to overheating will be avoided. It has been found convenient to allow the temperature to rise to about 40-45° C.; then, by controlled cooling, it is kept at this temperature until the reaction subsides. This requires about 1½ to 2 hours, more or less. The mixture is then heated slowly over a period of about 45 minutes to reflux temperature. The slow heating tends to form a granular pyridine hydrochloride which lends itself well to subsequent filtration. Refluxing is then continued for about two hours, to insure completion of the reaction. It is then cooled and filtered to remove the pyridine hydrochloride, recovering both the filtrate and filter cake. What is ordinarily a very slow filtration can be accomplished quickly by forming a bed of a filter-aid such as "Filter Cel" or "Super Cel" on a filtering medium such as cloth. This can be done by suspending 15-20 parts of the filter-aid in 200-300 parts of benzene and filtering this suspension through the filtering apparatus. The benzene can be used later for washing purposes. The pyridine hydrochloride is substantially freed of filtrate and then washed with benzene until substantially free of the di-tertiary-butoxydichlorosilane product.

The filtrate and washings are combined and the benzene is distilled off at atmospheric pressure. When there is no further benzene distillate, the product is cooled and the distillation continued at reduced pressure, e. g. an absolute pressure of 10 to 100 mm., to separate the di-tertiary-butoxydichlorosilane product from remaining materials (i. e. products of side reactions, impurities, etc.). The product tends to decompose when distilled at atmospheric pressure. A glass lined still, suitable for vacuum distillation, may be employed for both the distillation at atmospheric pressure and the subsequent distillation at reduced pressures.

After a small amount of low boiling material (mostly benzene) is removed in the vacuum distillation, the major portion of the product boils at 66° C. at 11 mm. absolute pressure. The distillate is sometimes cloudy with pyridine hydrochloride, but this settles out on standing and has proved to be of no consequence when the product is used in other reactions. About 630 parts by weight (85% of theoretical yield) of di-tert-butoxydichlorosilane is obtained. This is then here used by us as an intermediate product, from which we make aminosilanes, as herein described and claimed.

In one instance anhydrous ammonia was bubbled into a cooled solution of 24.5 grams of the di-t-butoxydichlorosilane in 150 cc. of benzene. The mixture was filtered and the filtrate distilled, yielding 16 grams (78% yield) of a liquid product boiling at 90-95° C. at 30 mm., which was shown by analysis to correspond closely to the theoretical chemical formula of di-t-butoxydiaminosilane. (A small amount of a viscous liquid polymeric residue remained after the distillation; this residue was shown on analysis to contain both silicon and nitrogen.) Increasing the rate of addition of the anhydrous ammonia improved the yield of the desired product.

A somewhat improved method of preparation involves the use of liquid ammonia in a pressure vessel. For example, under proper temperature and other conditions liquid ammonia may be poured into an open vessel onto the chlorosilane as a separate layer, the vessel closed, and the reaction initiated by agitation and mixing of the two liquids. Another method, employed commercially, involves forcing liquid ammonia into the closed reaction vessel containing the t-butoxy chlorosilane. (If the reaction vessel is not kept under substantial superatmospheric pressure, the ammonia will, of course, be in the form of a gas therein, rather than a liquid.)

In a specific example, a mixture of 151.1 parts heptane, 50.0 parts pure di-t-butoxydichlorosilane, and 20.7 parts liquid ammonia was made up in a pressure vessel, and held under pressure and with occasional agitation for 30 minutes. At the end of this period excess ammonia was carefully released, and the product was removed from the pressure reaction vessel. Ammonium chloride was then removed from the product by filtration, and the heptane was removed therefrom by vacuum distillation with a maximum temperature of 45° C. The remaining liquid was distilled under vacuum and yielded 83.6% by weight of the theoretical maximum yield of di-t-butoxydiaminosilane. The amino silane product had a boiling point of 81° C. at a pressure of 15 mm., and showed an analysis of 13.48% Si and 13.7% N (theoretical 13.55% Si and 13.55% N).

EXAMPLE II

*Preparation of di-t-amoxydiaminosilane*

In a manner similar to that of Example I, di-t-amoxydiaminosilane may be prepared from anhydrous ammonia and di-t-amoxydichlorosilane. In the preparation of di-tertiary-amoxydichlorosilane the process is substantially identical with that described in Example I for di-tert-butoxydichlorosilane, except that 528 parts by weight (6.0 mols) of tertiary-amyl alcohol are used in place of the 444 parts of tertiary-butyl alcohol above indicated. The boiling point of the di-tertiary-amoxydichlorosilane is 105° C. at 22 mm. pressure. Di-tertiary-amoxydiaminosilane boils at about 118° C. at 20 mm. pressure.

EXAMPLE III

*Preparation of other di-t-carbinoxy diaminosilanes*

In a manner similar to that of Examples I and II, bis(tert-dichlorobutoxy)dichlorosilane, B. P. 173-6° C. at 10 mm.; bis(1-ethylcyclohexoxy)dichlorosilane, B. P. 170-3° C. at 5 mm.; bis(dihydroterpineoxy)dichlorosilane, B. P. 195° C. at 7 mm.; and diterpineoxy- and dilinalooxy-dichlorosilanes (which latter two compounds could not be distilled without decomposition at 5 mm. pressure) were converted to the corresponding di-t-carbinoxy diaminosilanes by reaction with anhydrous ammonia. The dichloro compounds were prepared by reaction of silicon tetrachloride, in the presence of an acid acceptor such as pyridine, with dichloro-tert-butyl alcohol, 1-ethylcyclohexanol, dihydroterpineol, terpineol and linalool, respectively.

EXAMPLE IV

*Preparation of tri-t-butoxyaminosilane*

A solution of 98.0 parts of di-tert-butoxydichlorosilane, 31.6 parts of pyridine and 75 parts of tert-butyl alcohol was allowed to stand in a closed container for 72 hours or until the precipitation of pyridine hydrochloride ceased. The mixture was then filtered, the precipitate washed with benzene, and the filtrate fractionally distilled. Tri-tert-butoxychlorosilane (55 parts) was collected at 76° C. at 7 mm. pressure.

A mixture of 50 parts (0.177 mol) of the tri-t-butoxychlorosilane and 80 parts of liquid ammonia was then allowed to stand at room temperature until the excess ammonia had evaporated. The reaction proceeded rapidly, aided by occasional agitation. The reaction mixture was heated to remove the last traces of ammonia. The liquid was removed from the ammonium chloride, the latter rinsed with petroleum ether, and the washings added to the liquid. After removal of the petroleum ether, distillation at reduced pressure was carried out. There was obtained 39.8 parts of tri-t-butoxyaminosilane boiling at 82–5° C. at a pressure of 10–11 mm., corresponding to an 87.4% yield.

EXAMPLE V

*Preparation of dimethoxy-t-butoxyaminosilane*

Forty grams (1.25 mols) of methanol was reacted with 208 grams (1 mol) of t-butoxytrichlorosilane (which latter may be prepared in the manner hereinafter described in Example VIII) in the presence of 105 grams of pyridine; there was obtained 144 grams of a fuming liquid product boiling at 75–80° C. at 75 mm. and consisting primarily of a mixture of methoxy-t-butoxychlorosilanes. Of this mixture, a 45 gram portion was added to 100 grams of liquid ammonia at "dry ice" temperature, i. e. at the temperature of solid carbon dioxide. After completion of the reaction the excess ammonia was allowed to boil off, ether was added to replace the excess ammonia as a vehicle for the batch, the same was then filtered and the ether removed at reduced pressure. The remaining liquid was distilled under vacuum. A fraction was obtained, boiling at 80–90° C. at 50 mm. pressure, which was shown by analysis to correspond closely to the theoretical formula of dimethoxy-t-butoxyaminosilane.

EXAMPLE VI

*Preparation of alkyl t-alkoxy aminosilanes*

Amino compounds containing alkyl or aryl groups in addition to tertiary-carbinoxy groups may be prepared, for example, from alkyl or aryl polychlorosilanes obtained, for example, by means of the known Grignard reaction. Thus, ethyl trichlorosilane may be reacted with tertiary butyl alcohol in the presence of alpha-picoline, and the product further reacted with anhydrous ammonia, to yield ethyl-t-butoxyaminosilanes, e. g. ethyl-di-t-butoxyaminosilane, or ethyl-t-butoxydiaminosilane, depending upon the proportion of reactants.

EXAMPLE VII

*Preparation of n-butoxy di-t-butoxyaminosilane*

A mixture of 7.4 parts of n-butyl alcohol and 20.6 parts of di-t-butoxydiaminosilane which was made according to Example I, was slowly heated to 100–110° C. and held at that temperature range for one-half hour. During the initial heating, ammonia was evolved. The resulting mixture was fractionated and a portion recovered, boiling at 113.5° C. at 15 mm. and corresponding closely to n-butoxy-di-t-butoxyaminosilane.

Similarly, compounds were prepared in which methyl and isopropyl groups replaced the n-butyl groups.

EXAMPLE VIII

*Ammonolysis of t-butoxytrichlorosilane*

The intermediate chloro compound was prepared by the slow addition of a mixture of 37 parts (0.5 mol) of tertiary-butyl alcohol and 39.5 parts (0.5 mol) of pyridine to a solution of 200 cc. of petroleum ether (boiling range 35–60° C.) and 85 parts (0.5 mol) of silicon tetrachloride, cooled to about 17° C. The mixture was kept at this temperature during the addition which required five (5) hours and then it was heated to 30° C. over a four (4) hour period. The reaction mixture stood overnight and was then stirred for five (5) hours at 30° C., filtered and the product distilled. Seventy-one and one-half parts (0.39 mol) of tertiary-butoxytrichlorosilane (B. P. 70° C. at 87 mm.) was obtained, representing a yield of 69% of the theoretical.

This compound was treated with an excess of liquid ammonia under superatmospheric pressure. A soft resinous product was obtained which was soluble in benzene and contained hydrolyzable nitrogen. On standing, the resin gradually hardened, with evolution of ammonia and reduction in solubility. Analysis of this product as t-butoxytriaminosilane was inhibited because of the tendency of the compound to lose ammonia. However the product as made contains hydrolyzable nitrogen.

EXAMPLE IX

*Tert - butoxy - tert - monochlorobutoxydiaminosilane*

Tert - butoxy - tert - monochlorobutoxydichlorosilane was first prepared by the slow addition of a mixture of one mol of tertiary monochlorobutyl alcohol and one mol of alpha-picoline to a benzene solution of one mol of tert-butoxytrichlorosilane prepared as described under the last preceding example. The purified product boiled at 100–102° C. at 13 mm., had a density, at 20° C., of 1.144 gms./ml., and contained 25.3% active chlorine. The theoretical value for $$(t\text{—}C_4H_9O)(t\text{—}C_4H_8ClO)SiCl_2$$

is 25.4% active chlorine.

Liquid ammonia was reacted with the tert-butoxy - tert - monochlorobutoxydichlorosilane in ether solution at −78° C. The reaction proceeded rapidly at this temperature. The purified product gave the following results on analysis:

Boiling point _____ 80-85° C. at 2 mm.
$d^{20}$ _____ 1.034 gms./ml.
$n_D^{20}$ _____ 1.4429
Titratable nitrogen:
  Found _____ 11.3%
  Calculated for
    $(t-C_4H_9O)(t-C_4H_8ClO)SiNH_2)_2$ __ 11.6%

Conversion of the t-alkoxy chlorosilanes to the corresponding aminosilanes can be effected, as shown by the examples, by reaction with ammonia in various ways. It thus is possible to bubble gaseous ammonia into a solution of the silane, to run the reaction in the cold in liquid ammonia, to operate with excess ammonia in a closed pressure vessel, or to employ other similar technique. Since the t-carbinoxy aminosilanes will react slowly at room temperature with residual t-carbinoxy chlorosilanes, it is ordinarily preferable that excess ammonia be added as rapidly as possible, that the mixture be maintained at a low or moderate temperature, and that the reaction be completed in the least possible time. The resulting t-carbinoxy aminosilanes can be isolated, e. g. by distillation or crystallization or, when desired, can be used directly in solution.

In these reactions, the ammonia removes and replaces the chlorine atoms in the chlorosilane molecule. The procedure for making and the type of reaction involved in making di-tertiary-butoxydianilinosilane is analogous to that for the product just discussed, except that aniline is employed as the reactant with di-tertiary-butoxy-dichlorosilane. It will be understood that by using the same tertiary-carbinoxy chlorosilanes and other amines or ammonia derivatives, various other derivative products are made in accordance with the present invention. It will also be understood that by using other specific tertiary-carbinoxy chlorosilanes and by using the same or different amines, ammonia or ammonia derivatives, further derivative products may be produced and are likewise comprehended.

Where the compounds di-tertiary-butoxydichlorosilane or tri-tert-butoxychlorosilane are shown as intermediates in the preparation of the aminosilanes of this invention, there are also comprehended compounds which contain unlike carbinoxy radicals such as n-butoxy-tertiary-butoxydichlorosilane, tertiary-butoxy-tertiary-amoxy-dichlorosilane, tertiary-butoxy-tertiary-amoxy-tertiary-dichlorobutoxychlorosilane, etc. The products obtained on ammonolysis or amination of the last-mentioned compounds, or in general of tertiary-carbinoxy chlorosilanes in which the t-carbinoxy group or groups are partially chlorinated, have been found to be particularly stable against hydrolysis of the tertiary-carbinoxy group. Other products obtained on ammonolysis or amination of the respective corresponding chlorosilanes include di-tertiary-butoxydianilinosilane, tertiary-butoxyphenoxy-diaminosilane, and methoxy-t-butoxydiaminosilane.

Also we have made tertiary-butoxyoctadecoxy-dichlorosilane. Upon ammonolysis of this product, there results an organic silicon product containing hydrolyzable nitrogen as well as tertiary-butoxy and octadecoxy groups, which product is useful for many of the same purposes as di-tertiary-butoxydiaminosilane.

Additional intermediate products comprehended herein for further reaction with ammonia or the like in the production of the class of compounds contemplated in the present invention are those derived by reaction of silicon oxychloride with tertiary alcohols in the presence of an acid acceptor, e. g. pyridine. (However alpha picoline has been found to have advantages over pyridine in commercial scale operations.) Silicon oxychloride, $Si_2OCl_6$, which may occur during the formation of silicon tetrachloride, undergoes the same general type of reactions as the latter. For example, by reaction of this material with tert-butyl alcohol in proper molecular amounts, a number of new intermediates may be prepared, such as sym-tetra-tert-butoxy-dichlorosiloxane, di-tert-butoxytetrachlorosiloxane and penta-tert-butoxychlorosiloxane. Such compounds may be used as intermediates and converted into amino compounds, e. g. by reaction with liquid ammonia. For example, the following product has thus been prepared: tetra-tert-butoxydiaminodisiloxane, B. P. 134-136° C. at 13 mm., $n_D^{20}$ 1.4165, 7.00% nitrogen (calculated for $(C_4H_9O)_2Si(NH_2)OSi(NH_2)(OC_4H_9)_2$, N=7.07%). Di-tert-butoxytetraminodisiloxane, prepared by aminolysis of di-tert-butoxytetra-chlorodisiloxane* $(C_4H_9O)_2Si_2Cl_4O$, decomposes, with some resinification, on heating or prolonged standing at room temperatures.

Analogous derivatives of hexachlorodisilane, $Si_2Cl_6$, are also contemplated.

Compounds which distinguish over the prior art in a manner parallel to or analogous to the distinctions possessed by the silicon compounds hereinabove illustrated, but which contain an element of groups III to V of the periodic table other than silicon, for example boron, titanium, phosphorous, etc., are likewise contemplated. Di-t-butoxy titanium diamine $$(t-C_4H_9O)_2Ti(NH_2)_2$$

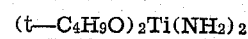

is an example of such compounds.

The groups attached to the carbinol carbon of the tertiary-carbinoxy group may, as hereinbefore indicated, be aliphatic or aromatic; if aliphatic, they may be saturated or unsaturated, and if cyclic, they can contain a hetero atom such as oxygen in the furan ring or sulfur in the thiophene ring. They can be substituted by additional groups which are unreactive toward silicon tetrachloride, such as the halogen, nitro, alkoxy, or acetoxy groups. If aromatic, they can also be substituted with additional groups unreactive toward silicon tetrachloride such as alkyl or any of the groups described above.

In the preparation of the aminosilanes, it is important to note that in many cases purification of the tert-carbinoxy chlorosilane intermediate is not necessary and that the derivative may be made directly, often even in the same reaction vessel, with the crude tert-carbinoxy chlorosilane. However, the use of a tert-carbinoxy chlorosilane which has been previously purified, as by distillation, is preferred in many cases.

The novel aminosilanes of this invention may be converted directly or indirectly to other forms where desired. For example, the soft resinous material obtainable by ammonolysis of t-butoxy-trichlorosilane (Example V) may readily be converted to a hard or even brittle resin, substantially insoluble in hydrocarbons, by moderate heating; a condensation reaction is apparently responsible for this change, since ammonia is ---
*A mere change in nomenclature from di-tert-butoxy-tetrachlorosiloxane.

liberated during the process. Again, the material obtained on ammonolysis of di-t-amoxydichlorosilane (Example II) may be hydrolyzed by water, and the product separated and heated to produce a resinous material which, depending on the degree of heating, may vary from a viscous oil through a soft tacky resin to a hard and brittle resin which may be either fusible or infusible. These various resinous products are insoluble in water. They may be used as plasticizing agents, as ingredients in extreme pressure lubricants, and in waxes and polishes. They are also useful as waterproof coating materials or ingredients thereof, and as ingredients in adhesives, paints and lacquers.

Among the most important of the characteristics of the aminosilanes of this invention are those which, as have been hereinbefore noted, include (a) the presence of hydrolyzable nitrogen, (b) the resistance to hydrolysis of an organic group or groups, as is the case when 1 to 3 tertiary alkoxy groups are present, (c) the absence (or lack of formation) of corrosive or degradative reaction products on application of the compound to cloth, paper and other acid-sensitive materials and (d) the ability of the compound to provide water-repellent and generally organophilic properties when applied to such materials, the resulting treated product being capable of effectively withstanding washing with water or hydrocarbon solvents. These characteristics render the aminosilanes of this invention particularly useful in the treatment of numerous and varied materials and substances. Another important characteristic or property of these aminosilanes, particularly with respect to the preparation and availability of the compounds themselves, is the stability of the amino or other corresponding nitrogen groups in the presence of at least one tertiary-carbinoxy group. Thus, compounds such as di-t-butoxydiaminosilane are found to be quite resistant to decomposition over extended periods of time, whereas primary carbinoxy diaminosilanes and alkyl diaminosilanes are unknown, presumably because if they were formed, they would be so unstable that they would immediately decompose.

The new products obtained by the treatment of materials such as cloth and paper with the new compounds of this invention, and the methods of making such products, are described and claimed in the copending application of one of us, Ser. No. 663,947, filed concurrently herewith.

Hereinabove we have illustrated various specific novel products of our invention and suitable specific methods for producing the same. It will be understood that variations from these procedures are contemplated and likewise variations in the substituent groups of the products, within the scope of the invention as illustrated herein, are contemplated. It will also be apparent from the foregoing description that highly important compounds of this invention are the tertiary alkoxy aminosilanes, of which di-tertiary-butoxydiaminosilane and di-tertiary-amoxydiaminosilane have heretofore been given as important examples. Prior to the time of our original invention, as described in our aforesaid parent application Ser. No. 470,904, to the best of our knowledge no one had ever produced tertiary alkoxy resilanes, or other tertiary-carbinoxy silanes as herein described. On the other hand, going back many years, prior workers in the art have, at least on a laboratory scale, produced a number of compounds having primary alkoxy groups attached to silicon; and ethyl orthosilicate has been produced commercially for a great many years. The large amount of prior art work on primary alkoxy silanes, the lesser amount of prior art work on secondary alkoxy silanes and the absence of any prior art work on tertiary alkoxy silanes, or on any tertiary-carbinoxy silanes which appear in any way to simulate or suggest the products of this invention, is significant in understanding the contribution of this invention. In this general connection, the differences in the chemistry of primary alcohols, secondary alcohols and tertiary alcohols are well known. Further, it is well known that the normal starting material in making silanes is silicon tetrachloride; also that HCl is a natural byproduct in making silanes of the type in question. Primary alcohols react only very slowly with HCl, secondary alcohols react more rapidly than the primary alcohols but still rather slowly with HCl, while tertiary alcohols react rapidly with HCl, vastly more rapidly than the primary alcohols and much more rapidly than the secondary alcohols: See "Organic Chemistry" by Fuson and Snyder, published by John Wiley & Sons, New York, 1942, page 51, where comparative times of reactions between HCl and normal butyl alcohol, secondary butyl alcohol and tertiary butyl alcohol, respectively, are shown to be "several hours," "ten minutes" and "one minute" respectively.

In view of this large difference in behavior of tertiary alcohols such as tertiary butyl alcohol, as compared with primary alcohols, for example, it is apparent that the use of tertiary alcohols, instead of primary alcohols, in various reactions would present marked differences and problems, from the commercial viewpoint.

This situation is exemplified by the well-known fact that while compounds such as primary and secondary butyl acetates have long been available commercially at a reasonable cost, tert-butyl acetate has not been available commercially, being too expensive and difficult to make and having no apparent advantage over the primary or secondary butyl acetates. Analogously others may have assumed that, even if they could succeed in satisfactorily making such compounds as tertiary-alkoxy chlorosilanes, still there would be no reason to do so, because of (1) the presumably greater difficulty and expense involved in making the same, and (2) the lack of expectation of superior properties of such tertiary-alkoxy silanes, or of new and different characteristics and usefulness thereof. Specifically, we have found no indication, and have no knowledge, that anyone prior to our invention ever foresaw that tertiary-alkoxy silanes, as herein illustrated, should be expected to have a stability so different from and superior to that of previously known alkoxy silanes (which were mostly primary alkoxy silanes and to a lesser extent, secondary alkoxy silanes). These differences have already been illustrated hereinabove but, as a further illustration, a dialkoxy dichlorosilane can be converted by aminolysis to the corresponding dialkoxy diaminosilane where at least one alkoxy group is a tertiary alkoxy group but not if both alkoxy groups are primary alkoxy groups. This is of outstanding significance in producing the preferred tertiary carbinoxy amino silanes, and related compounds, particularly described and claimed herein.

The foregoing is meant simply to illustrate and clarify, and not to limit our invention, except as required by the state of the art. Our tertiary alkoxy amino silanes, and related organic compounds of silicon, have various novel and unique properties and characteristics which widely distinguish them from prior art organic compounds of silicon, such as their use in making treated or water-repellent fibrous or sheet materials, as hereinabove disclosed, and it is intended herein fully to cover our contributions, without limitation by examples or illustrations given herein.

What we claim is:

1. An organic compound of silicon having both hydrolyzable nitrogen groups and relatively non-hydrolyzable carbinoxy groups attached to silicon, each hydrolyzable nitrogen group on hydrolysis thereof forming a non-acidic reaction product.

2. A tertiary-carbinoxy silicon compound having both tertiary-carbinoxy and hydrolyzable nitrogen groups attached to silicon.

3. A tertiary-alkoxy silicon compound having both amino and tertiary-alkoxy groups attached to silicon.

4. A tertiary-carbinoxy aminosilane.

5. A tertiary-alkoxy aminosilane.

6. A di-tertiary-carbinoxy diaminosilane.

7. A di-tertiary-alkoxy diaminosilane.

8. Di-tertiary-butoxydiaminosilane.

9. Di-tertiary-amoxydiaminosilane.

10. Chemical compounds having the molecular formula $$(RO)_xSiX_{4-x}$$

where R represents a monovalent tertiary organic radical, X represents a monovalent amino group and $x$ is an integer from 2 to 3.

11. Organic compounds of silicon having the molecular formula $$(RO)_xSiX_{4-x}$$

where R represents monovalent organic radicals, at least one RO group being a tertiary-carbinoxy group, X represents a monovalent amino group and $x$ is an integer from 2 to 3.

12. Organic compounds of silicon having the molecular formula

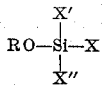

where RO is a tertiary-carbinoxy group, X is a monovalent hydrolyzable nitrogen group, and X' and X'' are monovalent groups, each hydrolyzable nitrogen group on hydrolysis thereof forming a non-acidic reaction product.

13. A tertiary-carbinoxy silicon compound containing two amino groups and two carbinoxy groups, all attached to silicon, at least one of said carbinoxy groups being a chlorinated-tertiary-alkoxy group.

14. A tertiary-carbinoxy silicon compound containing, attached to silicon, at least one tertiary-carbinoxy group and at least one readily hydrolyzable group from the class consisting of hydrolyzable nitrogen groups and short-chain primary alkoxy radicals, each said readily hydrolyzable group on hydrolysis thereof forming a non-acidic reaction product.

15. A tertiary-carbinoxy silicon compound containing, attached to silicon, at least one chlorinated-tertiary-carbinoxy group and at least one readily hydrolyzable nitrogen group, each said readily hydrolyzable nitrogen group on hydrolysis thereof forming a non-acidic reaction product.

GEORGE WESLEY PEDLOW, Jr.
CARL SHELLEY MINER, Jr.

REFERENCES CITED

The following references are of record in the file of this patent:

UNITED STATES PATENTS

| Number | Name | Date |
|---|---|---|
| 2,053,474 | Graves et al. | Sept. 8, 1936 |
| 2,265,962 | Bent et al. | Dec. 9, 1941 |
| 2,382,082 | McGregn et al. | Aug. 14, 1945 |
| 2,386,452 | Fleming | Oct. 9, 1945 |
| 2,389,802 | McGregn et al. | Nov. 27, 1945 |
| 2,429,883 | Johanson | Oct. 28, 1947 |

OTHER REFERENCES

Kipping et al., J. Chem. Soc., (London) 79 (1901) pages 449–459.

Feiser, "Organic Chemistry," 1944, page 32.

"Science News Letter," March 22, 1937, page 188.